United States Patent [19]

Yates

[11] 4,051,678

[45] Oct. 4, 1977

[54] THERMAL PANEL POWERED HEAT ENGINE

[76] Inventor: John W. Yates, 6005 Sixth St., Tampa, Fla. 33611

[21] Appl. No.: 557,512

[22] Filed: Mar. 12, 1975

[51] Int. Cl.² ............................ F03G 1/02; F03G 7/06
[52] U.S. Cl. ...................................... 60/641; 60/675; 60/531; 60/659
[58] Field of Search ................ 60/675, 641, 531, 643; 126/270, 271

[56] References Cited

U.S. PATENT DOCUMENTS

| | | | |
|---|---|---|---|
| 378,998 | 3/1888 | Barthel | 60/675 |
| 784,005 | 2/1905 | Ketchum | 60/641 |
| 2,942,411 | 6/1960 | Hutchings | 60/641 |
| 2,969,637 | 1/1961 | Rowekamp | 60/659 X |
| 3,441,482 | 4/1969 | Avery | 60/531 X |
| 3,495,402 | 2/1970 | Yates | 60/641 |
| 3,604,822 | 9/1971 | Saxe | 60/531 |
| 3,785,144 | 1/1974 | Fairbanks | 60/531 |

FOREIGN PATENT DOCUMENTS

| | | | |
|---|---|---|---|
| 142,429 | 5/1920 | United Kingdom | 60/531 |
| 155,005 | 12/1920 | United Kingdom | 60/531 |

Primary Examiner—Allen M. Ostrager
Attorney, Agent, or Firm—Bernard & Brown

[57] ABSTRACT

A heat engine operating from power derived from the difference in temperatures between, for example, solar heat ambient air and an underground water source. A plurality of enclosed tanks are supported in radially opposed pairs from a framework which is rotatable about a horizontal axis. Each tank has its interior divided by a flexible membrane to provide first and second chambers. The first chamber of each tank contains a liquid propellant, and the two first chambers of each radially opposed pair of tanks are interconnected for fluid communication therebetween. The second chamber of each tank contains a high vapor pressure fluid and is coupled to an evaporator coil positioned adjacent its tank and to a condensor coil positioned adjacent the radially opposite tank. The lower-most tank has its first chamber first coil within a hot reservoir to cause the high vapor pressure fluid to expand, applying pressure to the flexible diaphragm of that tank. This forces the liquid propellant from that tank to the radially opposite, elevated tank in which it applies pressure to the diaphragm, forcing the high vapor pressure fluid from that tank to its second coil which is within a cold reservoir, aiding condensation of the high vapor pressure fluid. A thermal panel is made up of a metallic plate member and a pipe in thermal contact therewith. An underground water source supplies one of the hot and cold reservoirs, while water passing through the thermal panel pipe supplies the other. Because the thermal panel plate member is exposed to sunlight and ambient air, the thermal panel supplies the hot reservoir when its temperature is greater than the temperature of the underground water or the cold reservoir when the ambient air temperature is less than the temperature of the underground water. A thermal storage tank stores heat from the heat elements powering the generator for heating the water of the hot reservoir when the ambient air temperature is close to the underground water temperature.

12 Claims, 3 Drawing Figures

THERMAL PANEL POWERED HEAT ENGINE

The present invention pertains to a heat engine. More particularly the present invention pertains to an engine which derives power from the difference in temperature between two sources, for example an ambient air source, such as a thermopanel exposed to the atmosphere, and a source of underground water having a relatively fixed temperature.

It is becoming more and more desirable to develop new sources of energy to reduce dependency upon conventional sources such as hydrocarbon fuels. To this end, considerable effort has been directed toward development of such energy sources as heat engines and solar cells. U.S. Pat. No. 3,785,144 shows a heat engine utilizing the difference in temperature between hot and cold reservoirs as a source of energy. In the heat engine of that patent, a rotatable shaft is connected to the center of a disc which has a plurality of heat exchanger sets disposed about its circumference. Each heat exchanger set includes two pairs of heat exchangers, with each pair communicatingly connected to its radially opposite pair. Each of the pairs of heat exchangers includes two enclosed containers which are adapted to be immersed simultaneously in the hot and cold reservoirs. The heat exchanger sets contain a high vapor pressure liquid. When a particular container is in the hot reservoir, the liquid in the container is heated, increasing its vapor pressure to drive liquid from the container into the container of the same set within the cold reservir and then across the disc to the radially opposite heat exchanger set. This increases the weight in the second heat exchanger set, and gravity causes that heat exchanger set to fall, thereby rotating the disc to provide energy.

U.S. Pat. No. 3,509,716 likewise shows a heat engine which utilizes solar energy as the heat source. A circular framework has a plurality of arcuate tanks positioned around its circumference. Diagonally opposite pairs of tanks are interconnected by conduits, and a volatile liquid is within each tank. When a tank is in a lower position, it passes through a hot reservoir, and the volatile liquid is forced to the opposite upper tank, raising the weight thereof. The upper tank moves downwardly due to this increased weight, causing the framework to rotate. While these and other heat engines are capable of providing energy without reliance on a hydrocarbon fuel, a considerable heat difference is required between the hot reservoir and either the cold reservoir or the ambient temperature to permit satisfactory operation, since a large quantity of the volatile liquid or high vapor pressure liquid must be passed from one reservoir to another to increase the weight sufficiently to cause rotation of the heat engine.

Attempts have been made recently to obtain energy by use of solar panels in which heat from the sun is utilized to warm water or other fluid. Typically, in such a solar panel a flat metallic collector plate is positioned beneath a clear sheet of glass of plastic to absorb heat from the sunlight. Beneath the metallic collector plate, water is circulated which absorbs the heat from the collector plate and distributes it to various locations, either to provide heat for warming purposes or to provide energy in other forms. The glass or plastic sheet is provided to shelter the metallic collector plate from ambient air so that it is heated only by the incident sunlight. A further description of solar panels and their use can be found in the article "Sun Power: a far-out idea comes down to earth" at page 38 of the Dec. 18, 1974 issue of *Chemical Week*. Such solar panel powered sources are operable only during sunlight; consequently, energy must be stored for use during periods when sunlight is not available. Excess hot water from such a system might be stored in giant underground, heavily insulated tanks from which it is used as required. Alternatively, the energy can be converted to electricity and stored in batteries. Such systems are able to provide heat for buildings in winter and air conditioning for the same buildings in summer. However, such solar panel powered systems are capable, at best, of providing only about 85-95% of the heating requirements, and conventional heating systems must be available for operation during periods of long absence of sunlight.

My earlier U.S. Pat. No. 3,495,402 shows a power system in which the temperature difference between ambient air and ambient water is utilized to heat a motive fluid which then drives an engine. With this system, an auxillary heat source is desirable for additional power, particularly during times of small temperature differentials.

The present invention is a heat engine capable of improved operation from the temperature difference between, for example, solar heat or ambient air and an underground water source. In the heat engine of the present invention, a plurality of enclosed tanks are supported in radially opposed pairs from a frame member which is rotatable about a horizontal axis. Each tank has its interior divided by a flexible diaphragm to provide first and second chambers. The first chamber of each tank contains a liquid propellant, such as water, and the two first chambers of each radially opposed pair of tanks are interconnected for fluid communication therebetween. The second chamber of each tank contains a high vapor pressure fluid, for example a fluorocarbon such as a fluorochloromethane, known commerically as Freon. Chlorodifluoromethane, or Freon 22, is particularly well suited for use. This second chamber is coupled to a first coil positioned adjacent its tank and to a second coil positioned adjacent the radially opposite tank. In operation, the lower-most tank has its first coil within a reservoir of hot water. This causes the high vapor pressure fluid to expand, applying pressure to the flexible diaphragm of that tank. Consequently, the diaphragm flexes and the liquid within the first chamber of the tank is forced upwardly to the first chamber of the radially opposite, elevated tank. In that tank the water forces the flexible diaphragm to flex, forcing the high vapor pressure fluid within that second chamber into its second coil adjacent the lower tank. This coil is positioned within a cold water reservoir aiding the high vapor pressure fluid to condense. The weight of the water in the elevated tank causes that tank to move downwardly, rotating the structure.

In a preferred embodiment of the present invention, a thermal panel and an underground water source are utilized as sources of the hot and cold water for the reservoirs. During periods of sunlight or relatively high ambient air temperature, the thermal panel is utilized to heat the water for the hot water reservoir while the underground water source is utilized to cool the water of the cold water reservoir. When the ambient temperature becomes less than the temperature of the underground water source, valves are turned so that the underground water source is utilized to control the temperature of the hot water reservoir while the thermal panel is used to cool the water of the cold water reservoir.

These and other aspects and advantges of the present invention, are more apparent in the following detailed description and claims, particularly when considered in conjunction with the accompanying drawings in which like parts bear like reference numerals. In the drawings:

Figure 1:
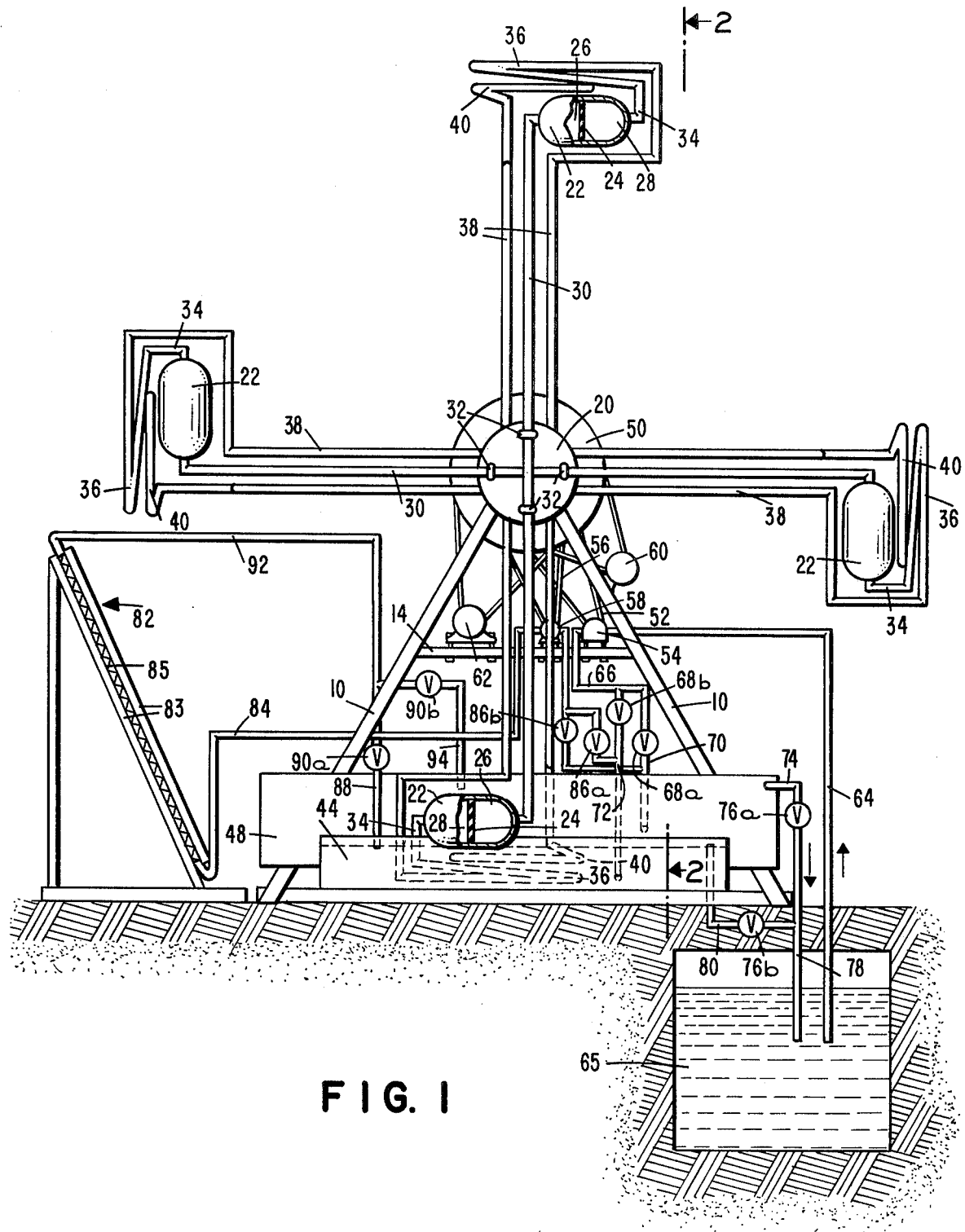
FIG. 1 is a side elevational view of a thermal panel powered heat engine in accordance with the present invention.
Figure 2:
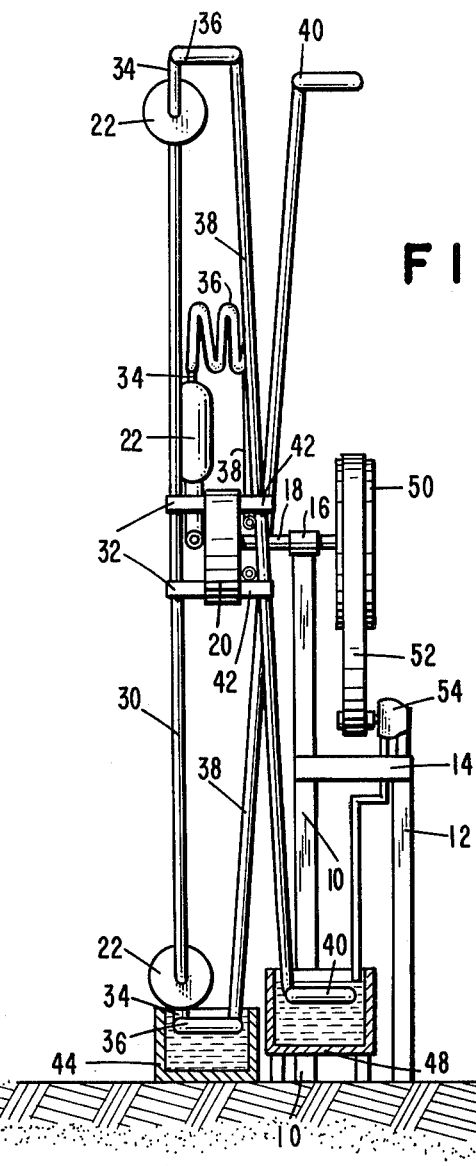
FIG. 2 is a view taken along line 2—2 of FIG. 1.

As seen in FIGS. 1 and 2, a support frame is made up of front legs 10 and rear legs 12 which support platform 14. Front legs 10 also support journalled bushing 16 through which rotatable shaft 18 passes. Disc 20 is supported from one end of shaft 18 to rotate therewith.

A plurality of tanks 22 are provided. Each tank 22 has within it a flexible diaphragm 24 dividing the interior of the tank into a first chamber 26 and a second chamber 28. Tanks 22 are arranged about rotatable disc 20 in radially opposed pairs. While FIG. 1 depicts four tanks 22 arranged in two radially opposed pairs, any number of radially opposed pairs could be provided. The first chambers 26 of each radially opposed pair of tanks 22 are interconnected by pipe 30 which is fastened to rotatable disc 20 by mounting brackets 32. At least one of the first chambers 26 of each radially opposed pair of tanks 22 contains a liquid propellant, such as water. The second chamber 28 of each tank 22 is coupled by a pipe 34 to one end of an evaporator coil 36 adjacent that tank 22. The second end of the evaporator coil 36 associated with a tank 22 is coupled by pipe 38 to one end of a condensor coil 40 which is adjacent the radially opposite tank 22. Pipes 38 are attached by mounting brackets 42 to rotatable disc 20. Brackets 32 and 42 and pipes 30 and 38 thus support tanks 22, evaporator coils 36 and condensor coils 40 on disc 20. The second end of each condensor coil 40 is closed. Second chambers 28 contain a high vapor pressure fluid, such as a fluorochloromethane.

A hot water reservoir 44 is positioned on the ground so that, as disc 20 rotates, each evaporator coil 36 passes in turn through reservoir 44 while in the lowermost position of rotation. Adjacent hot water reservoir 44, a cold water reservoir 48 is positioned so that, as the evaporator coil 36 associated with a tank 22 passes through hot water reservoir 44, the condensor coil 40 of the radially opposite tank 22 passes through cold water reservoir 48.

Pulley 50 is mounted on the second end of rotatable shaft 18 to drive belt 52, which is coupled to the drive shaft of pump 54. As seen in FIG. 1, several such pulleys and belts are preferably provided to drive several components as disc 20 rotates, although for clarity only pulley 50, belt 52 and pump 54 are shown in FIG. 2. Thus, preferably, second belt 56 drives a second pump 58, a compressor 60 can be driven by another belt, and a generator 62 can be driven by an additional belt. Other components can be similarly driven, if desired.

Pipe 64 couples an underground water source 65 to the inlet of pump 54. Pipe 66 couples the outlet of pump 54 to valve 68a to valve 68b. Pipe 70 couples valve 68a to cold water resevrior 48, while pipe 72 couples valve 68b to hot water reservoir 44. Pipes 70 and 72 have their outlets positioned adjacent the lower surfaces of the reservoirs 48 and 44, respectively. Outlet pipe 74 from cold water reservoir 48 is coupled by valve 76a to pipe 78 which returns to underground water source 65 or goes to other suitable discharge. Outlet pipe 80 from hot water reservoir 44 is similarly coupled by valve 76b to pipe 78. Outlet pipes 74 and 80 are coupled near the top of reservoirs 48 and 44, respectively.

Thermal panel 82 has its outlet coupled by pipe 84 to the inlet of pump 58, the outlet of which is coupled by valve 86a to inlet pipe 72 of hot water reservoir 44 and by valve 86b to inlet pipe 70 of cold water reservoir 48. Outlet pipe 88 from hot water reservoir 44 is coupled by valve 90a to pipe 92 which connects to the inlet of thermal panel 82. Similarly, outlet pipe 94 from cold water reservoir 48 is coupled by valve 90b to pipe 92.

Thermal panel 82 can be any panel capable of bringing the temperature of the water passing through it toward the ambient temperature. Thus, by way of example, thermal panel 82 might be a series of metallic plates 83 having the water passing beneath in pipes 85 in thermal contact with plates 83. Pipes 84 and 92 are then coupled to the two ends of pipe 85. As described in the aformentioned article from *Chemical Week*, solar panels generally are made up of metallic plates positioned beneath glass or plastic to permit solar energy to pass through, while isolating ambient air. Since the metallic plates of thermal panel 82 are not positioned beneath such glass or plastic panels, thermal panel 82 is responsive to both the solar energy and the ambient temperature. Consequently, thermal panel 82 is suitable both as a source for heating of the water in hot water reservoir 44, during times when the ambient temperature is above the temperature of the water in underground water source 65, and as a source for cooling of the water in cold water reservoir 48, during times when the ambient temperature is below the temperature of the water in underground water source 65.

During operation when the ambient temperature surrounding thermal panel 82 is above the temperature of the water in underground water source 65, all of the "a" valves are opened, while all of the "b" valves are closed. The evaporator coil 36 of the lowermost tank 22 is within hot water reservoir 44, and so its high vapor pressure fluid expands, forcing the diaphragm 24 within that tank 22 to push the water within its portion 26 from that tank 22 to the radially opposite, uppermost tank 22. Consequently, the diaphragm 24 within the upper tank 22 forces the high vapor pressure fluid within portion 28 of that upper tank 22 through the associated pipe 34, coil 36, and pipe 38 to the condenser coil 40 within cold water reservoir 48. The cold water causes that fluid to condense. The weight of the water within the upper tank 22 causes that tank to move downwardly. In so doing, disc 20 is rotated. This brings the evaporator coil 36 of the next tank 22 into hot water tank 44 and the condenser coil 40 of its radially opposite tank 22 into cold water reservoir 48, and the process repeats. Thus, disc 20 is rotated to rotate pulley 50. Belts 52 then drive the several power devices, such as pumps 54 and 58, compressor 60, and generator 62. Pump 54 causes the water from underground source 65 to flow to the cold water reservoir 48, assuring that that water remains at a substantially constant temperature, while pump 58 moves water through thermal panel 82 to hot water reservoir 44, controlling the temperature of that water.

When the ambient temperature surrounding thermal panel 82 is below the temperature of the water is underground water source 65, the several valves are reversed so that the "b" valves are opened while the "a" valves are closed. Water from underground source 65 then passes to the hot water reservoir 44, while water from the cold water reservoir 48, which receives heat from the condenser coils 40, passes through thermal panel 82 to be cooled.

Figure 3:
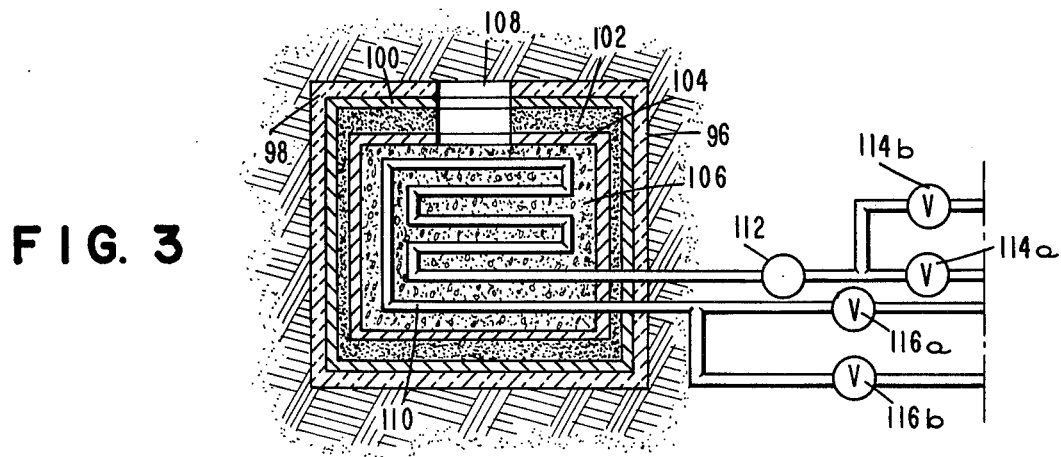
FIG. 3 is a schematic representation of a thermal storage tank suitable for use with a heat engine in accordance with the present invention.

To provide operation during times when the ambient temperature surrounding thermal panel 82 is close to the temperature of the water in underground water source 65, heat can be stored in thermal storage tank 96 as depicted in FIG. 3. Thermal storage tank 96 can be positioned at any convenient location and preferably is positioned below ground for thermal insulation. Tank 96 has an outer layer 98 of foamed insulation material such as Styrofoam. Within insulating layer 98 is a thin metal shell 100 which surrounds a layer 102 of dry sand. Steel case 104 is within sand layer 102 and encloses a hot aggregate 106 of, for example, gravel. Each of the layers 98 through 104 is provided with an opening at access point 108 to permit access to the interior of tank 96. Pipe 110 is ositioned within aggregate 106 to be in close thermal contact therewith. One end of pipe 110 is coupled by pump 112 to valve 114a and to valve 114b. The second end of pipe 110 is connected to valve 116a and to valve 116b. The second side of valve 114a is connected to pipe 84 from thermal panel 82, while the second side of valve 116a is connected to pipe 92 of thermal panel 82. The second side of valve 114b is connected to inlet pipe 72 to hot water reservoir 44. The second side of valve 116b is connected to outlet pipe 88 from hot water reservoir 44.

When the temperature of the air surrounding thermal panel 82 is higher than the temperature of the water in underground source 65 so that thermal panel 82 is supplying the hot water requirement of reservoir 44, valves 114a and 116a can be opened and pump 112 activated, while valves 114b and 116b are closed. Then, in addition to warming the water in hot water reservoir 44, thermal panel 82 provides hot water to coil 110 which heats aggregate 106. When the air surrounding thermal panel 82 is so close to the temperature of the water in underground source 65 that an insufficient temperature difference exists to permit effective operation of the system, valves 68b, 76b, 86a, 86b, 90a, 90b, 114a, and 116a are closed, while valves 68a, 76a, 114b, and 116b are opened. Pump 112 then circulates water from hot water reservoir 44 through coil 110 in which that water absorbs heat from hot aggregate 106. Thus, tank 96 serves as the source of heat for the hot water in reservoir 44 during such times. Tank 96 can also be utilized to heat water for other uses. By way of example, if a third set of valves 114 and 116 are provided, cold water can be pumped through pipe 110 in which that water is heated and passed on for hot water usage.

It is thus seen that thermal panel 82 serves alternately as a heat source and as a heat sink or cooling source, making possible operation of the heat engine of the present invention both in the presence of sunlight and in the absence of sunlight. Utilization of the diaphragm 24 within each tank 22 provides improved operation, since a smaller amount of high vapor pressure fluid must be heated to achieve the desired increase in weight in the upper tank 22. Thus a workable heat engine might be made using tanks 22 with diaphragms 24 even without condensor coils 40 and with a heat source other than thermal panel 82. Although the present invention has been described with reference to a preferred embodiment, numerous rearrangements and modifications could be made and still the result would be within the scope of the invention.

What is claimed is:

1. A heat engine comprising:
   a plurality of tanks, each tank having therein a flexible diaphragm dividing the tank interior into first and second chambers;
   a rotatable structure;
   means connecting said plurality of tanks to said rotatable structure in radially opposed pairs for rotation therewith;
   first pipe means connecting the radially opposed tanks for fluid communication between the first chamber of each tank and the first chamber of that tank's radially opposed tank;
   a plurality of evaporator coils, each evaporator coil having first and second open ends, one evaporator coil uniquely associated with each tank;
   a plurality of condensor coils, each condensor coil having an open end and a closed end, one condensor coil uniquely associated with each tank;
   second pipe means connecting each tank to its associated evaporator coil first open end for fluid communication between the second chamber of the tank and its associated evaporator coil and for rotation of said evaporator coils with said tanks as said rotatable structure rotates;
   third pipe means coupling said evaporator coils and said condensor coils to connect the second open end of each evaporator coil to the open end of the condensor coil associated with the tank with which the evaporator coil is associated, for fluid communication between the commonly associated evaporator coil and condensor coil and for rotation of said condensor coils with said tanks as said rotatable structure rotates;
   a fluid propellant within the first chambers of said tanks;
   a high vapor pressure fluid within the second chambers of said tanks;
   a hot water reservoir positioned adjacent the lower extremity of rotation of said evaporator coils for passage in turn therethrough of each evaporator coil as said rotatable structure rotates;
   a cold water reservoir positioned for passage in turn therethrough of each condensor coil, as said rotatable structure rotates, with each condensor coil passing through the cold water reservoir as the evaporator coil associated with the tank radially opposed to the tank with which that condensor coil is associated passes through the hot water reservoir; and
   output means coupled to said rotatable structure for generating power in response to rotation of said rotatable structure.

2. A heat engine as claimed in claim 1 further comprising:
   a thermal panel including a metallic plate member exposed to ambient air and pipe means for passing water in thermal contact with said metallic plate member;
   an underground source of water having a substantially constant temperature; and
   valve means capable of alternatively assuming a first valve condition in which said thermal panel pipe means is coupled to said hot water reservoir for fluid communication therebetween while said underground source of water is coupled to said cold water reservoir for fluid communication therebetween and a second valve condition in which said thermal panel pipe means is coupled to said cold water reservoir for fluid communication therebetween while said underground water source is coupled to said hot water reservoir for fluid communication therebetween.

3. A heat engine as claimed in claim 2 further comprising a thermal storage tank, and in which in the first valve condition of said valve means said thermal panel is also coupled to said thermal storage tank for fluid communication therebetween to store heat in said thermal storage tank, and in which said valve means is capable of assuming a third valve condition in which said thermal storage tank is coupled to said hot water reservoir for fluid communication therebetween while said underground water source is coupled to said cold water reservoir for fluid communication therebetween.

4. A heat engine comprising:

a plurality of tanks, each tank having therein a flexible diaphragm dividing the tank interior into first and second chambers;

a rotatable structure;

means connecting said plurality of tanks to said rotatable structure in radially opposed pairs for rotation therewith;

first pipe means connecting the radially opposed tanks for fluid communication between the first chamber of each tank and the first chamber of that tank's radially opposed tank;

a plurality of evaporator coils, each evaporator coil having an open end and a closed end, one evaporator coil uniquely associated with each tank;

second pipe means connecting each tank to its associated evaporator coil open end for fluid communication between the second chamber of the tank and its associated evaporator coil and for rotation of said evaporator coils with said tanks as said rotatable structure rotates;

a fluid propellant within the first chambers of said tanks;

a high vapor pressure fluid within the second chambers of said tanks;

a hot water reservoir positioned adjacent the lower extremity of rotation of said evaporator coils for passage in turn therethrough of each evaporator coil as said rotatable structure rotates;

output means coupled to said rotatable structure for generating power in response to rotation of said rotatable structure.

5. A heat engine as claimed in claim 4 further comprising a thermal panel including a metallic plate member exposed to sunlight and ambient air and pipe means for passing water in thermal contact with said metallic plate member; and means coupling said thermal panel pipe means with said hot water reservoir for fluid communication therebetween.

6. A heat engine comprising a thermal panel including a metallic plate member exposed to ambient air and pipe means contacting said metallic plate member for passing water therethrough and in thermal contact with said metallic plate member;

a plurality of tank means rotatable support means supporting said plurality of tank means in radially opposed pairs for rotation of said tank means in a substantially vertical plane;

pipe means connecting the radially opposed tank means for fluid communication between each tank means and its radially opposed tank means;

a fluid propellant within said tank means;

a hot water reservoir positioned adjacent the lower extremity of rotation of said tank means for passage in turn therethrough of each tank means as said rotatable support means rotates to cause the fluid propellant of a tank means within said hot water reservoir to be driven to the radially opposite, elevated tank means to increase the weight thereof;

means coupling said thermal panel pipe means with said hot water reservoir for fluid communication therebetween; and output means coupled to said rotatable support means for generating power in response to rotation of said rotatable support means.

7. A heat engine comprising:

a pair of tank means;

a pair of evaporator coils, one evaporator coil connected to each of said tank means for fluid communication therebetween;

rotatable support means supporting said pair of tank means in radially opposed positions for movement of said tank means and evaporator coils in a substantially vertical plane;

pipe means connecting said tank means for fluid communication therebetween;

a fluid propellant within said tank means and evaporator coils;

a hot water reservoir positioned for passage in turn thereinto of each evaporator coil as said rotatable support means moves the associated tank means to the lower extremity of movement to cause the fluid propellant of a tank means associated with an evaporator coil within said hot water reservoir to be driven to the radially opposite, elevated tank means to increase the weight thereof; and output means coupled to said rotatable support means for generating power in response to movement thereof.

8. A heat engine comprising:

first tank means adapted to hold a fluid propellant;

a first evaporator coil connected to said first tank means for fluid communication therebetween;

second tank means adapted to hold a fluid propellant;

a second evaporator coil connected to said second tank means for fluid communication therebetween;

pipe means connecting said first and second tank means for fluid communication therebetween;

heat source means;

support means supporting said first and second tank means and said first and second evaporator coils for movement between a first position and a second position, with said first position having said first tank means elevated relative to said second tank means and having said second evaporator coil adjacent said heat source means to heat high vapor pressure fluid in said second evaporator coil to cause that fluid to expand and cause flow of fluid propellant into said first tank means to cause movement of said first and second tank means to said second position, and with said second position having said second tank means elevated relative to said first tank means and having said first evaporator coil adjacent said heat source means to heat high vapor pressure fluid in said first evaporator coil to cause that fluid to expand and cause flow of fluid propellant into said second tank means to cause movement of said first and second tank means to said first position; and output means coupled to said tank means for generating power in response to movement of said tank means between said first and second positions.

9. A heat engine as claimed in claim 7 further comprising a pair of condenser coils, one condenser coil connected to each of said tank means for fluid communication therebetween and for movement with said tank means; and a cold water reservoir for passage in turn therethrough of each condenser coil as the associated tank means is elevated and the evaporator coil associated with the other tank means passes through said hot water reservoir.

10. A heat engine as claimed in claim 8 further comprising a first condensor coil connected to said first tank means for fluid communication therebetween and for movement with said tank means; a second condensor coil connected to said second tank means for fluid communication therebetween and for movement with said tank means; and cooling means; and in which said support means supports said first and second tank means, said first and second evaporator coils, and said first and second condenser coils, with said first position having said first condensor coil adjacent said cooling means and said second position having said second condenser coil adjacent said cooling means.

11. A heat engine comprising:
a plurality of tank means;
a plurality of evaporator coils, each evaporator coil connected to a uniquely associated one of said tank means for fluid communication therebetween;
rotatable support means supporting said plurality of tank means in radially opposed pairs for rotation of said tank means and said evaporator coils in a substantially vertical plane;
pipe means connecting the radially opposed tank means for fluid communication between each tank means and its radially opposed tank means;
a fluid propellant within said tank means and evaporator coils;
a hot water reservoir positioned for passage in turn therethrough of each evaporator coil as said rotatable support means rotates the associated tank means to the lower extremity of movement to cause the fluid propellant of a tank means associated with an evaporator coil within said hot water reservoir to be driven to the radially opposite, elevated tank means to increase the weight thereof; and
output means coupled to said rotatable support means for generating power in response to rotation of said rotatable support means.

12. Apparatus as claimed in claim 11 further comprising:
a plurality of condenser coils, each condenser coil connected to a uniquely associated one of said tank means for fluid communication therebetween and for rotation therewith;
a cold water reservoir positioned for passage in turn therethrough of each condenser coil as the associated tank means is elevated and the evaporator coil of the radially opposed tank means passes through said hot water reservoir.

* * * * *